US008801085B2

(12) United States Patent
Bourke

(10) Patent No.: US 8,801,085 B2

(45) Date of Patent: Aug. 12, 2014

(54) IMPACT-PROTECTION CANOPY

(76) Inventor: John Bourke, Thurles (IE)

(*) Notice: Subject to any disclaimer, the term of this patent is extended or adjusted under 35 U.S.C. 154(b) by 187 days.

(21) Appl. No.: 13/255,771

(22) PCT Filed: Mar. 9, 2010

(86) PCT No.: PCT/EP2010/052994

§ 371 (c)(1), (2), (4) Date: Nov. 7, 2011

(87) PCT Pub. No.: WO2010/103014

PCT Pub. Date: Sep. 16, 2010

(65) Prior Publication Data

US 2012/0043784 A1 Feb. 23, 2012

(30) Foreign Application Priority Data

Mar. 9, 2009 (IE) .................................. S2009/0185

(51) Int. Cl.
*B60J 7/00* (2006.01)

(52) U.S. Cl.
USPC ..................................... 296/190.03; 280/756

(58) Field of Classification Search
USPC ............ 296/107.03, 190.03, 190.08; 280/756
See application file for complete search history.

(56) References Cited

U.S. PATENT DOCUMENTS 4,120,528 A 10/1978 Samide
4,202,565 A 5/1980 Mosch

FOREIGN PATENT DOCUMENTS

JP 2004331308 A 11/2004
WO 2006041343 A1 4/2006

OTHER PUBLICATIONS

International Search Report, mailed Jun. 28, 2011, in counterpart International Patent Application No. PCT/EP2010/052994, 2 pgs.
English translation of abstract of JP 2004331308, 1 pg.

*Primary Examiner* — Joseph Pape
(74) *Attorney, Agent, or Firm* — Tutunjian & Bitetto, P.C.

(57) ABSTRACT

An impact-protection canopy for use with an operator work area of a plant vehicle is provided. The impact-protection canopy includes a shelf mounted on a support assembly which is, in turn, mountable on the plant vehicle. The shelf is mounted on the support assembly such that the shelf is movable to and from an extended working position over the operator work area and a retracted stowed position clear of the operator work area. In this way, the shelf can be positioned above the operator work area to provide protection to the operator from items falling from above.

24 Claims, 12 Drawing Sheets

134
140
132
136
171
162
158
(a)
(b)
(c)
(d)
(e)
(f)

IMPACT-PROTECTION CANOPY

RELATED APPLICATIONS

The subject application is a U.S. National Stage Application of International Application No. PCT/EP2010/052994, filed on 9 Mar. 2010, which claims the priority of Irish Patent Application No.: S2009/0185, filed on 9 Mar. 2009, the contents of which are herein incorporated by reference in its entirety.

INTRODUCTION

The present invention relates to an impact-protection canopy suitable for use with an operator work area of a plant vehicle.

There are many plant vehicles or other engineering vehicles wherein an operator must work in an operator work area outside the cab of the vehicle. Such operator work areas include the 'basket' of a cherry-picker type vehicle. Often, such operator work areas comprise a surrounding safety rail, the function of the safety rail being to ensure that the operator does not fall off the edge of the operator work area. This type of construction has the advantage that the operator's movements within the operator work area are not limited or impeded by the safety rail and therefore the operator can carry out the necessary tasks from within the operator work area.

On the other hand, if machines having an operator work area fitted with safety rail are to be used in mines, as is common, further protection is required for the operator. In such locations, there is a risk of rock or other debris falling from above into the operator work area. Indeed, in some situations, this is precisely the task the operator in the operator work are will be trying to achieve, that is, releasing debris that has been loosened by blasting or other means. This is obviously very dangerous for the operator as any debris falling from above could result in serious injury or death.

It will be understood throughout the specification that the term operator work area refers to an area distinct from the main cab of the vehicle.

It is an object therefore of the present invention to provide an impact-protection canopy suitable for an operator enclosure of a plant vehicle that overcomes at least some of the above-mentioned problems.

STATEMENTS OF INVENTION

According to the invention there is provided an impact-protection canopy suitable for use with an operator work area of a plant vehicle wherein the canopy comprises a shelf mounted on a support assembly which is in turn mountable on the plant vehicle, the shelf being mounted on the support assembly such that the shelf is movable to and from an extended working position over the operator work area and a retracted stowed position clear of the operator work area.

In this way, the operator may, if carrying out work that includes a risk of debris or other items falling from above, cause the canopy of the vehicle to extend over the work area so that he is protected from such falling objects while in the operator work area. If however, the work does not include the risk of falling objects, the canopy may be retracted so as not to impinge unnecessarily on the operator's activities in the operator work area.

In one embodiment of the invention there is provided an impact-protection canopy in which, in the extended working position, the shelf is mounted on the support assembly in a cantilevered manner. In this way, the support assembly may be located at one side of the operator work area, with the shelf extending therefrom over the operator work area. This leaves the remaining sides of the operator work area unimpeded by support elements and reduces the obstruction to the operator work area caused by the impact-protection canopy.

In one embodiment of the invention there is provided an impact-protection canopy in which the shelf is movable to and from a raised operating position clear above the operator work area and a lowered storage position. In this way, the canopy may be raised above the operator's head for use and then lowered when not required. This allows the canopy to be stored in a convenient position on the vehicle when not in use and will not limit the versatility, usability, and roadworthiness of the vehicle. Furthermore, the lowered impact-protection canopy will not impinge on sight lines from the cab of the plant vehicle, thereby ensuring that the impact-protection canopy does not hinder the driving ability of the plant vehicle.

In another embodiment of the invention there is provided an impact-protection canopy further comprising a hydraulic Impact Energy Absorption Assembly (IEAA). In this way, the energy from an impact on the impact-protection canopy may be dispersed throughout the impact-protection canopy, reducing the effects of that impact on the operator in the operator work area. A hydraulic IEEA is a particularly efficient manner of absorbing the impact energy.

In a further embodiment of the invention there is provided an impact-protection canopy in which the hydraulic IEAA comprises a hydraulic lift cylinder connected to, and suitable for raising and lowering, the support assembly, the hydraulic lift cylinder having a head side. This is a particularly efficient manner of providing a hydraulic IEEA. The hydraulic lift cylinder supports the impact-protection canopy while it is in use, and will continue to support it even when subjected to an impact. The hydraulic cylinder will absorb at least a portion of the impact energy by the compression of the hydraulic fluid therein. The impact energy can then be released from the hydraulic lift cylinder in a controlled manner.

In an alternative embodiment of the invention there is provided an impact-protection canopy in which the hydraulic impact energy absorption assembly further comprises an energy absorbing means connected to the hydraulic lift cylinder. In this way, further impact energy absorption can be provided, such that impact energy not transformed into potential energy in the compressed hydraulic fluid will be diverted to the further energy absorbing means.

In one embodiment of the invention there is provided an impact-protection canopy in which the energy absorbing means comprises a compartment divided by a flexible membrane into at least two chambers, a first chamber in fluid communication with the head side of the hydraulic lift cylinder and a second chamber comprising a compressible gas. This is particularly efficient manner of absorbing the impact energy by using it to compress a gas within a chamber. Preferably, the gas is an inert gas such as nitrogen. When the impact-protection canopy is subjected to an impact, the energy is relayed to the hydraulic lift cylinder causing the hydraulic fluid in the head side thereof to be pushed into the first chamber of the energy absorbing means. This will in turn deflect the flexible membrane between the chambers into the second chamber, compressing the gas therein. In this way, at least a portion of the impact energy is transformed into potential energy stored within the compressed gas. This potential energy may be released subsequently in a controlled manner by releasing the pressure on the head side of the hydraulic lift cylinder.

In another embodiment of the invention there is provided an impact-protection canopy in which the first chamber of the energy absorbing means is in fluid communication with the head side of the hydraulic lift cylinder by way of a narrow neck portion. In this, a portion of the impact energy is expended in forcing the hydraulic fluid through the narrow neck portion.

In another embodiment of the invention there is provided an impact-protection canopy in which the shelf comprises a platform supported by at least one substantially rigid arm mounted on the support assembly, wherein the platform is deflectably coupled to the at least one arm. In this way, if a falling item impacts the platform, the energy of the impact may cause a flection or deflection of the platform about the rigid arm supporting it. In this way, some of the impact energy may be dissipated by the flexing of the platform without affecting the arms as such a deflection absorbs at least a portion of the impact energy and reduces the amount of impact energy that must be dealt with by the other parts of the impact-protection canopy. By a substantially rigid arm is meant an arm that in normal operation of the impact-protection canopy, the arm will be rigid, however, when subjected to a significant impact, for example the impact of the 250 kg weight falling from 5 m onto the impact-protection canopy, the arm will in fact bend under the impact. Such arms may be implemented in the form of cylindrical bars, 50 mm in diameter, of EN24T steel. By having a deflectable coupling between the at least one arm and the platform, the arm can move within its coupling as it bends under impact. The deflection of such a rigid arm can absorb up to 3 tonnes of force from an impact to the impact-protection canopy.

In an alternative embodiment of the invention there is provided an impact-protection canopy in which the shelf comprises a pair of substantially rigid arms. The use of a pair of rigid arms to support the platform is a particularly suitable arrangement, providing strength and rigidity to the shelf, facilitating energy relay throughout the impact-protection canopy and aiding in engagement with the support assembly.

In one embodiment of the invention there is provided an impact-protection canopy in which the arms comprise substantially cylindrical bars and are coupled to the platform by engagement with complementarily dimensioned bushings in the platform. This is a particularly efficient way of allowing the platform to deflect about the rigid arms under impact. The bushings of the platform rotate about the bars as the platform flexes due to an impact force. Furthermore, if the impact is sufficient to bend the arms, the movement of the bars due to the bending will be accommodated within the bushings, the end of the arms sliding within the bushing as the bars bend. Preferably a tight fit is provided between the bars and the bushings, as this will absorb a portion of the impact energy as friction between the bushings and the bars, transforming the impact energy into heat energy.

In another embodiment of the invention there is provided an impact-protection canopy in which the platform comprises a lattice of longitudinal and transverse bars. In this way, the weight of the platform may be reduced but also allowing for a strong construction. The lattice also allows for the platform to dissipate energy by flexing under impact.

In an alternative embodiment of the invention there is provided an impact-protection canopy in which the support assembly comprises a pair of spaced apart substantially vertical legs each having a bracket affixed to the upper end thereof and a block engaging each bracket so as to bridge the space between the legs. This construction of support assembly provides strength and stability, facilitates the relay of impact energy through the impact-protection canopy and aids connection with the shelf.

In a further embodiment of the invention there is provided an impact-protection canopy in which each arm of the shelf engages one of the brackets. This is a particularly efficient manner of providing a strong connection between the shelf and the support assembly, allowing impact energy to travel from the shelf to the support assembly.

In one embodiment of the invention there is provided an impact-protection canopy further comprising a plurality of sleeves mountable on the plant vehicle, the vertical legs of the support assembly being slidably mounted in the sleeves. In this way, the height of the shelf may be adjusted by adjusting the position of the legs within the sleeves.

In an alternative embodiment of the invention there is provided an impact-protection canopy in which each vertical leg comprises a pair of vertical members. In this way, further stability and energy absorption and dissipation is provided. Additionally, the use of pairs of vertical members allows the impact-protection canopy to resist the turning moment from impacts towards the distal edge of the shelf.

In one embodiment of the invention there is provided an impact-protection canopy in which the vertical members are hollow. This is an efficient construction of the legs of the support assembly, reducing the weight thereof.

In another embodiment of the invention there is provided an impact-protection canopy in which the pair of vertical members are bridged by one bracket. In this way, the vertical members are in engagement with the shelf, such that the shelf is securely linked to the support assembly, allowing the relay of impact energy from the shelf to the support assembly and impact energy absorption assembly.

In another embodiment of the invention there is provided an impact-protection canopy in which the support assembly comprises a locking assembly for maintaining the raised or lowered position of the shelf. In this way, the canopy can be maintained in the desired position.

In a further embodiment of the invention there is provided an impact-protection canopy in which the locking assembly is hydraulically operated. This is a particularly efficient manner of operating the locking assembly.

In an alternative embodiment of the invention there is provided an impact-protection canopy in which the locking assembly comprises a plurality of locking pins, slidable to and from a locked position engaging one of a pair of apertures in each of the sleeves and legs and an open position clear of the apertures. In this way, the position of the legs relative to the sleeves may be locked to ensure the shelf remains at the desired height.

In another embodiment of the invention there is provided an impact-protection canopy in which the apertures are longer than the height of the locking pins. In this way, when subject to impact, the locking pins may move within the sleeves. When subjected to a significant impact, the compression of the hydraulic fluid within the hydraulic lift cylinder may cause the shelf and support assembly to be lowered slight, causing the locking pins to move within the apertures. By providing elongated apertures, with space for the locking pins to move, this is facilitated, and the pins will only resist extreme vertical movement of the legs of the support assembly. Preferably, the edges of the apertures may be covered in an energy absorbing coating, such as a suitable rubber, to absorb impact energy that has been relayed to the pins of the locking assembly.

In one embodiment of the invention there is provided an impact-protection canopy in which the top of the shelf has an energy absorbing covering thereon. In this way, some of the energy from an impact to the shelf will be absorbed by the energy absorbing covering.

In a further embodiment of the invention there is provided an operator work area for a plant vehicle comprising the impact-protection canopy of the invention. This is particularly efficient use of the impact-protection canopy of the invention.

In an alternative embodiment of the invention there is provided a plant vehicle comprising an operator work area fitted with comprising the impact-protection canopy of the invention. This is particularly efficient use of the impact-protection canopy of the invention.

DETAILED DESCRIPTION OF THE INVENTION

The invention will now be more clearly understood from the following description of an embodiment thereof given by way of example only with reference to the accompanying drawings in which.

Figure 7:
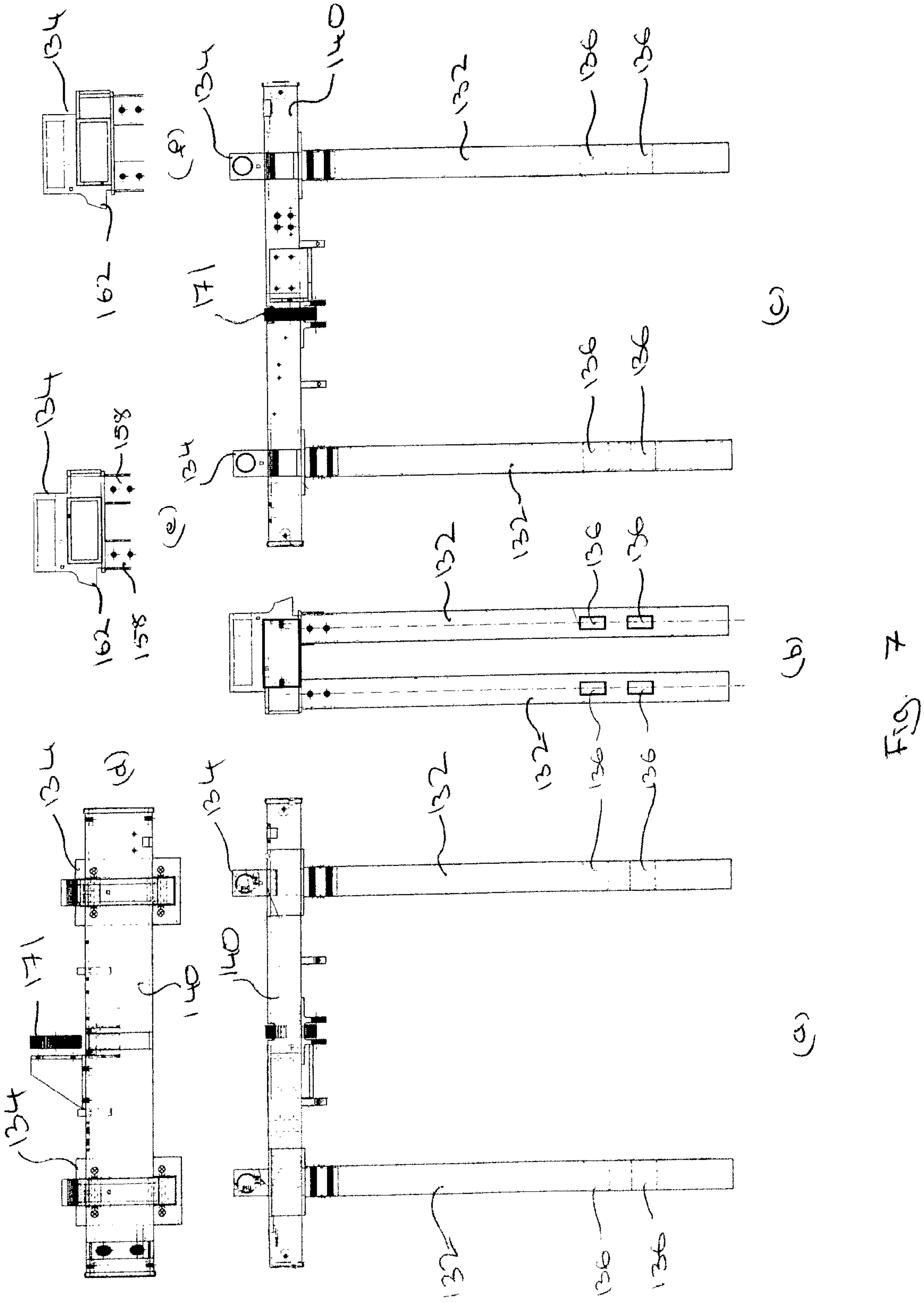
Figure 8:
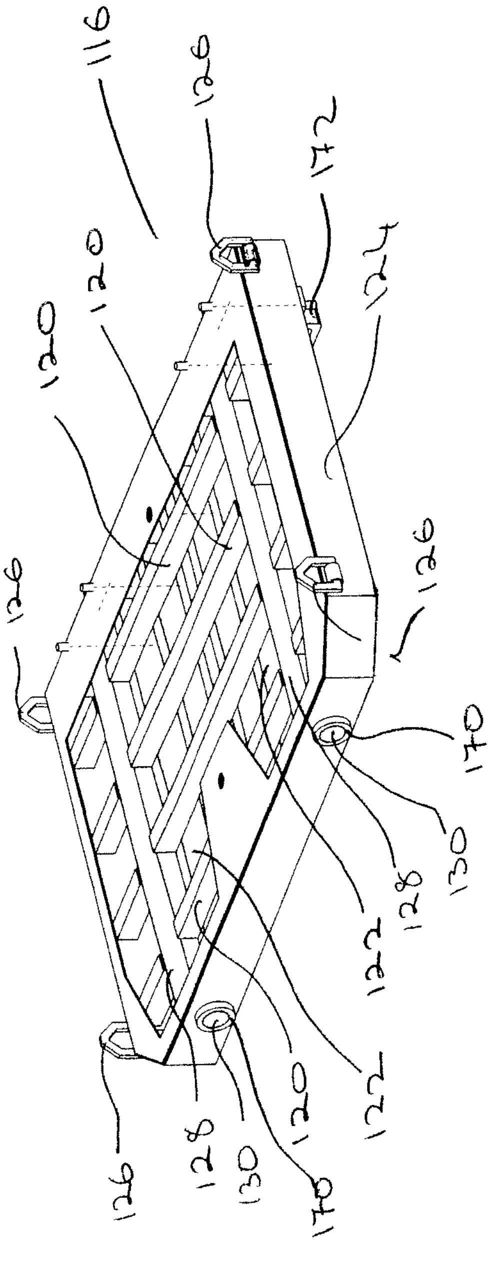
Figure 9:
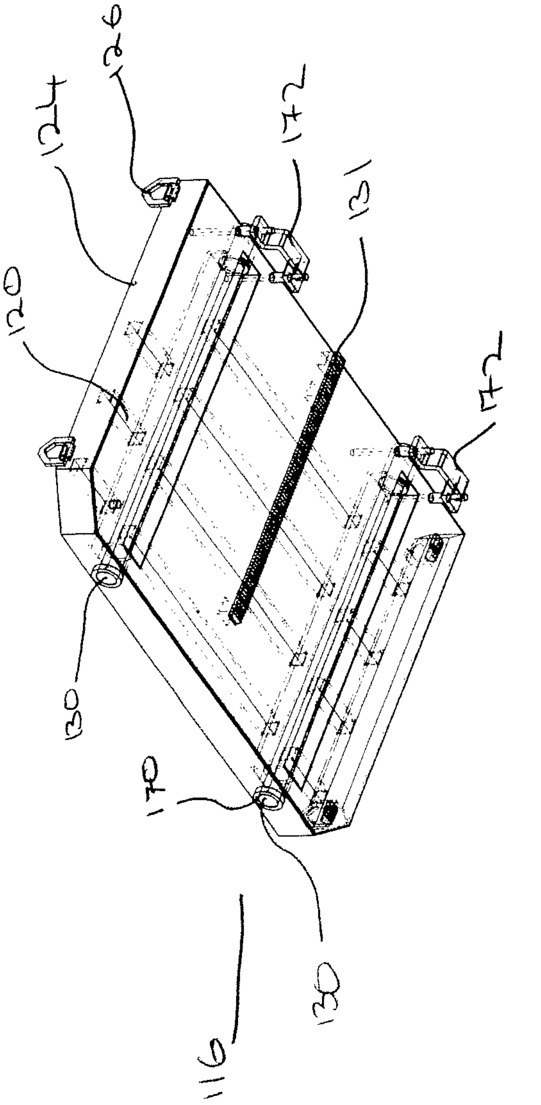
Figure 10:
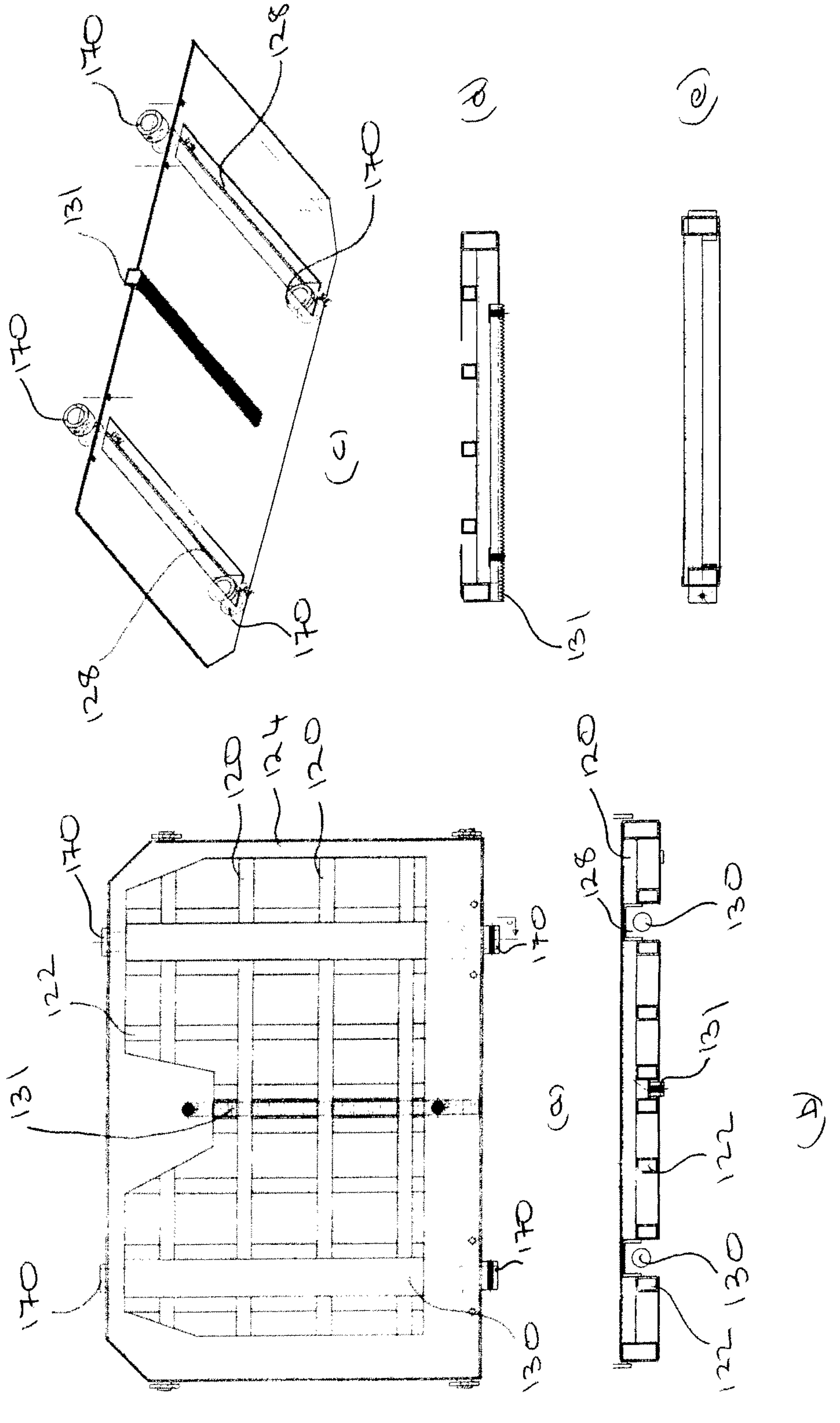
Figure 11:
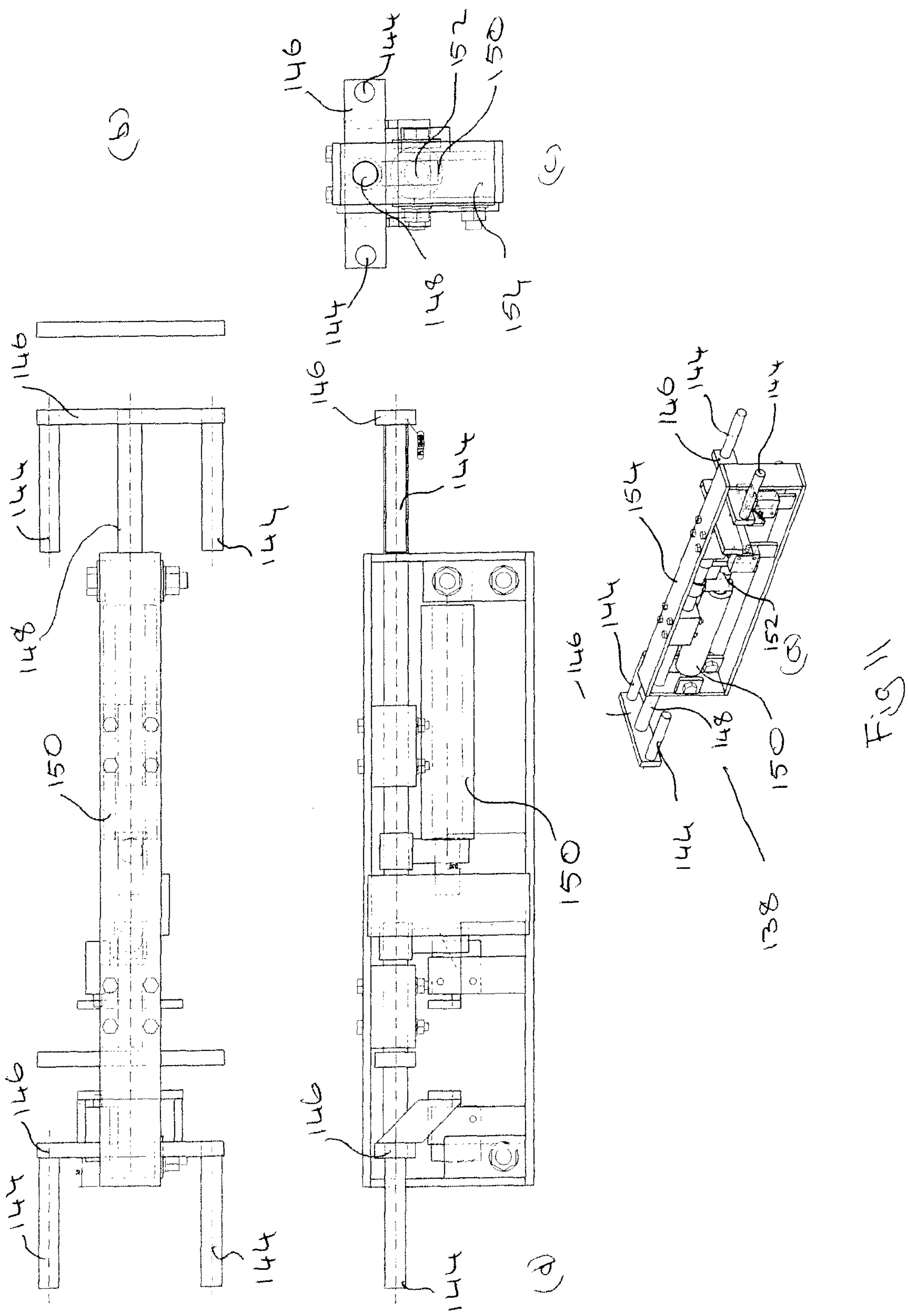
Figure 12:
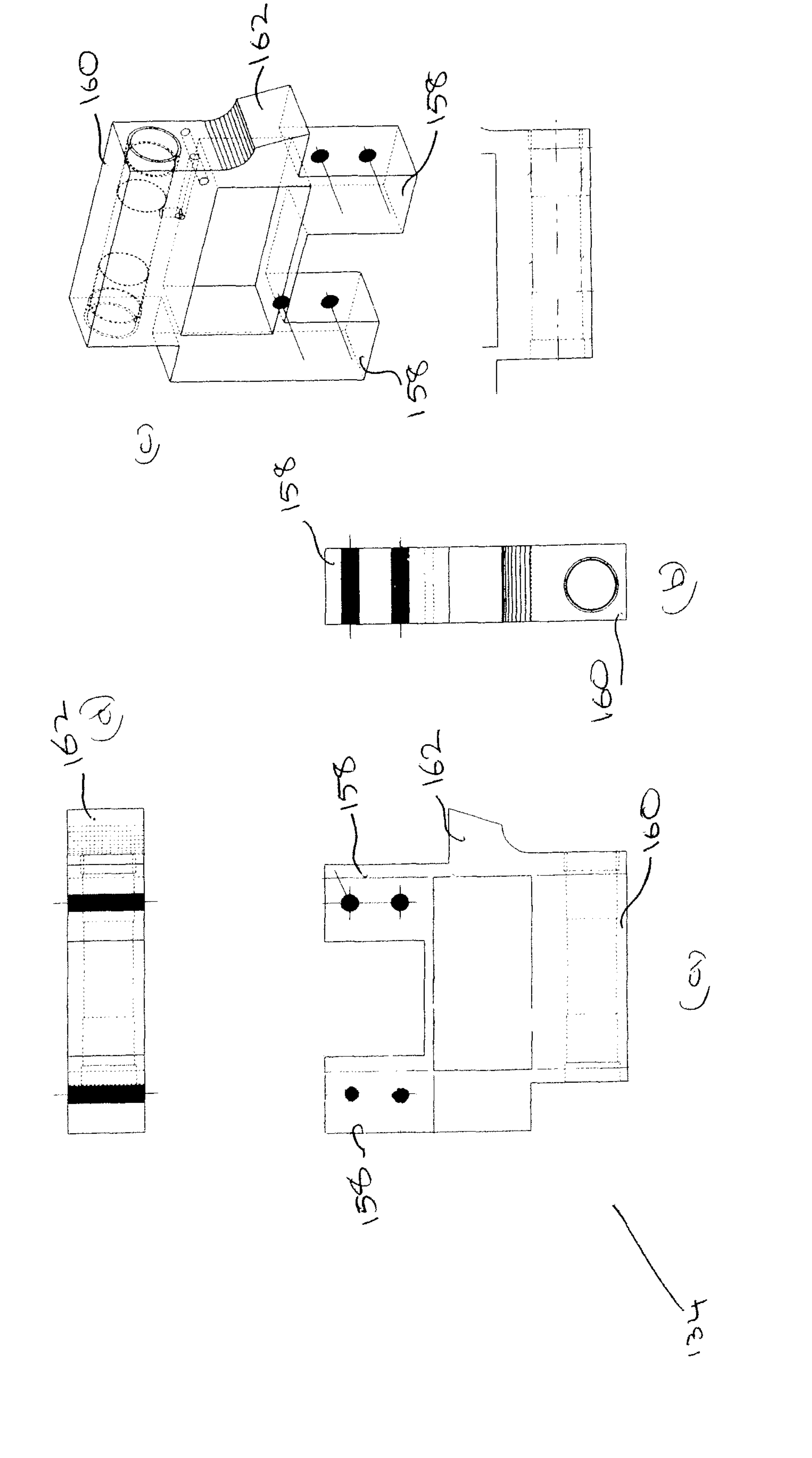
Figure 8:
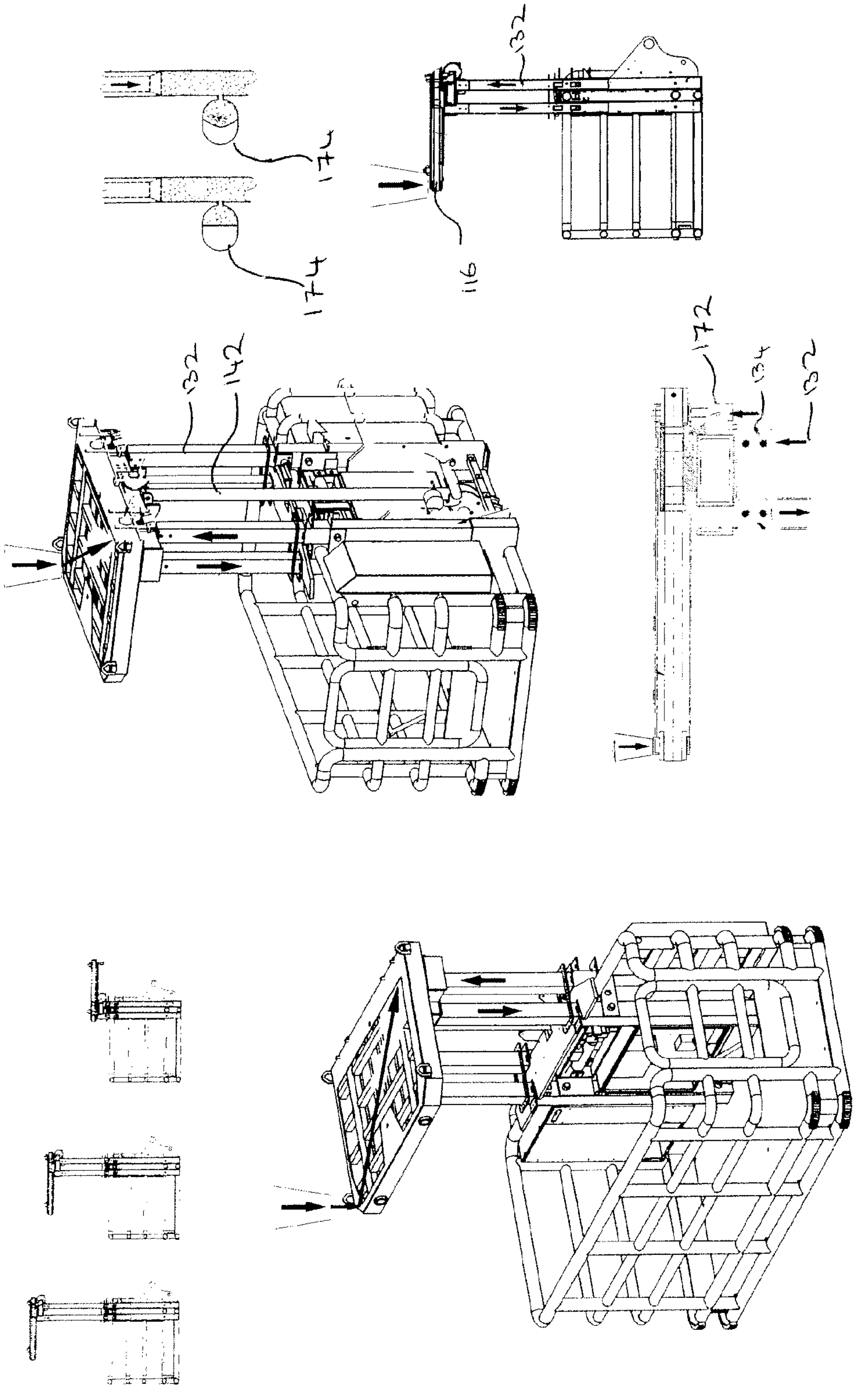
Figure 14:
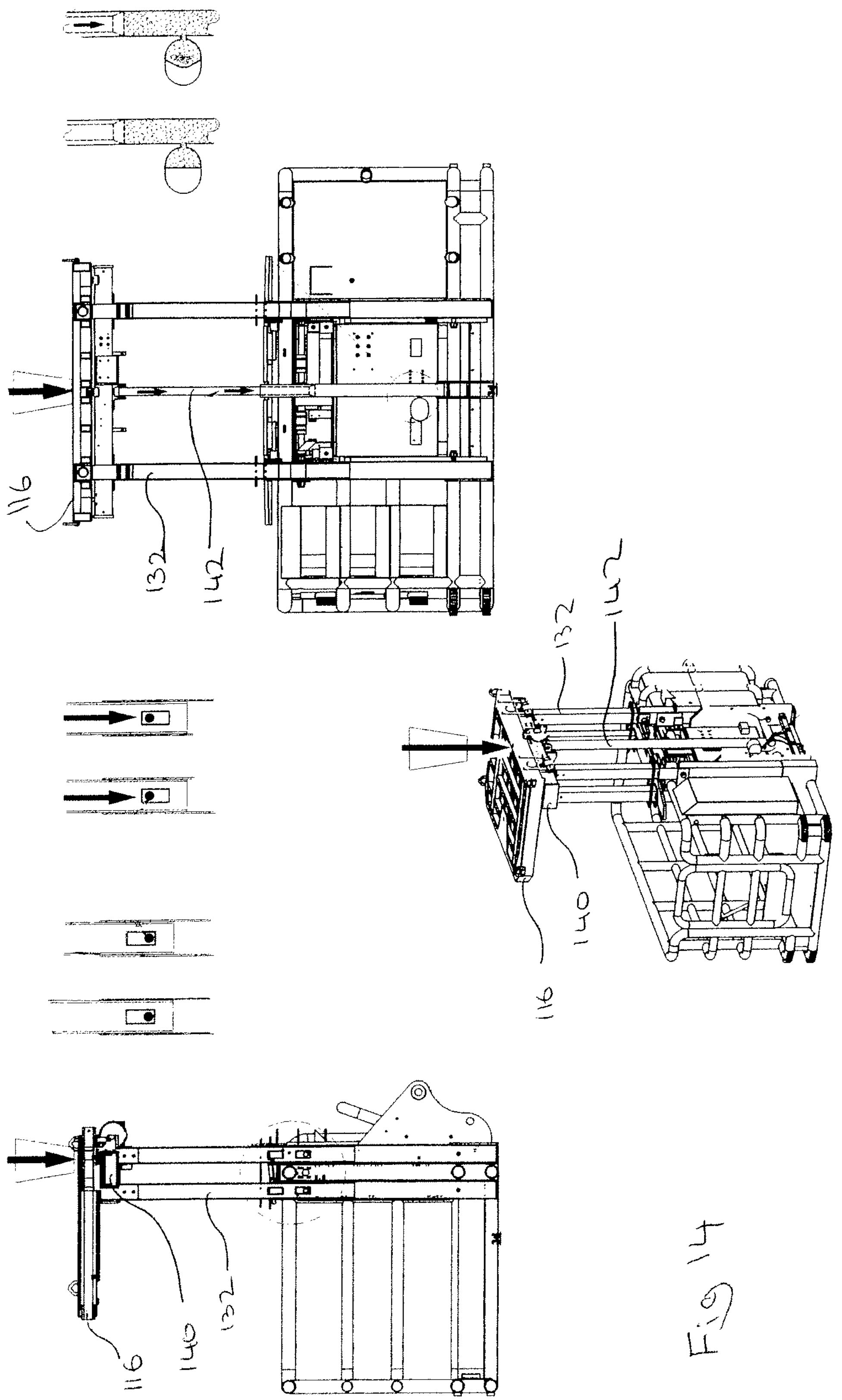
Figure 15:
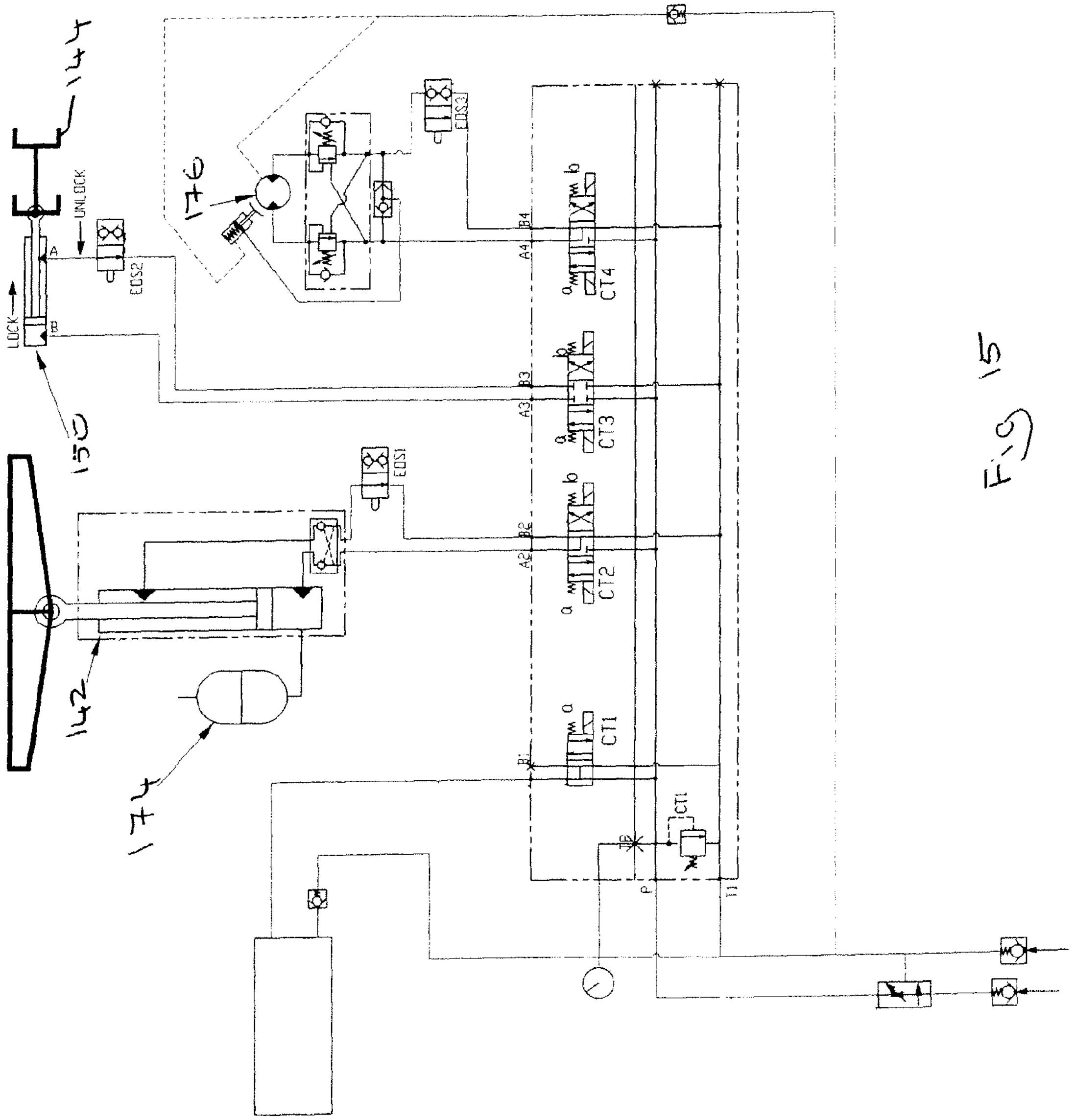

FIGS. 7(*a*), (*b*), (*c*) and (*d*) are front, side, rear and top views respectively of the support assembly of the impact-protection canopy according to the invention;

FIGS. 7 (*e*) and (*f*) are cross-sections of the bracket of the support assembly of the impact-protection canopy according to the invention;

FIG. 8 is a top perspective view of the shelf of the impact-protection canopy according to the invention;

FIG. 9 is a bottom perspective view of the shelf of the impact-protection canopy according to the invention;

FIGS. 10(*a*), (*b*) and (*c*) are front, top and underneath perspective views respectively of the shelf of the impact-protection canopy according to the invention;

FIG. 10(*d*) is a section of the shelf of the impact-protection canopy along the line B-B in FIG. 10(*a*);

FIG. 10(*e*) is a section of the shelf of the impact-protection canopy along the line C-C in FIG. 10(*a*);

FIGS. 11(*a*), (*b*), (*c*) and (*d*) are perspective, top, side and front views respectively of the locking pin assembly of the impact-protection canopy of the invention;

FIGS. 12 (*a*), (*b*), (*c*) and (*d*) are side, front, perspective and top views of the bracket of the support assembly of the impact-protection canopy according to the invention;

FIG. 13 shows the flow of energy through the impact-protection canopy of the invention from an impact at the corner of the shelf;

FIG. 14 shows the flow of energy through the impact-protection canopy of the invention from an impact above the hydraulic lift cylinder of the impact-protection canopy; and FIG. 15 is a diagram of the hydraulic circuit of the invention.

Referring to the drawings, and initially to FIGS. 1 to 10 thereof, there is shown an operator work area for a plant vehicle, the operator work area indicated generally by the reference numeral 100, at least partially surrounded by a safety rail 104. The operator enclosure 100 mounts a canopy indicated generally by the reference numeral 106. The operator work area comprises a floor 108 to which the safety rail 104 is secured. The safety rail 104 comprises five parallel spaced apart horizontal bars 110 secured together by a plurality of uprights 112. The lowest horizontal bar 110 is secured to the edge of the floor 108 of the operator work area 100. The safety rail assembly is essentially defines a cuboid shape, one side of which comprises a gate 114 though which the operator may enter the operator work area 100.

The impact-protection canopy 106 comprises a shelf 116 mounted on a support assembly indicated generally by the reference numeral 118. The shelf 116 comprises a platform formed by a lattice of longitudinal bars 120 and transverse bars 122 welded together. In use, the platform extends forwardly from the support assembly 118, which is located at the rear of the operator work area 100. The lattice is surrounded by a frame 124, which is welded thereto. The lattice of longitudinal bars 120 and transverse bars 122 and the frame 124 are preferentially made from mild steel. The top of the shelf 116 is covered with a sheet (not shown) of mild steel which in turn has a covering (not shown) of Shore 60 rubber affixed thereto. In practice, a 30 mm sheet of rubber has proved to be effective at reducing the effect on an impact on the impact-protection canopy. The platform is substantially rectangular in shape with a lifting lug 126 attached adjacent each corner thereof.

The platform further comprises a pair of parallel inverted channels 128, running parallel to the transverse bars 122 of the lattice. The channels 128 bridge the longitudinal bars 120 and engage the frame 124 that forms the edge of the platform. The shelf 116 further comprises a pair of arms 130 with are located within the channels 128 of the shelf 116. Each arm 130 preferably comprises a cylindrical bar, 50 mm in diameter, of EN24T steel. Each arm 130 extends into the frame 124 at the edge of the platform. Each end of each arm 130 engages a substantially cylindrical bushing 170 mounted in suitable circular apertures in the frame 124 of the platform and secured thereto. The arms 130 are slidably mounted in the bushings 170 and are not otherwise affixed to the bushings or to the platform. The dimensions of the arms and the bushings are chosen such that a very close fit is provided between these components. The arms 130 are slideable within the bushings but a significant force is required to cause such a sliding motion, such as an impact of the 250 kg body falling from 5 m onto the impact-protection canopy 106. The bottom of the shelf 116 further mounts a rack 131 for engagement with a complementary pinion 171 operated by a hydraulic motor (not shown). A pair of retaining brackets 172 depend from the underside of the platform, in line with the bushings 170 at the rear of the platform. The retaining brackets 172 substantially form a loop depending from the rear of the platform.

Figure 1:
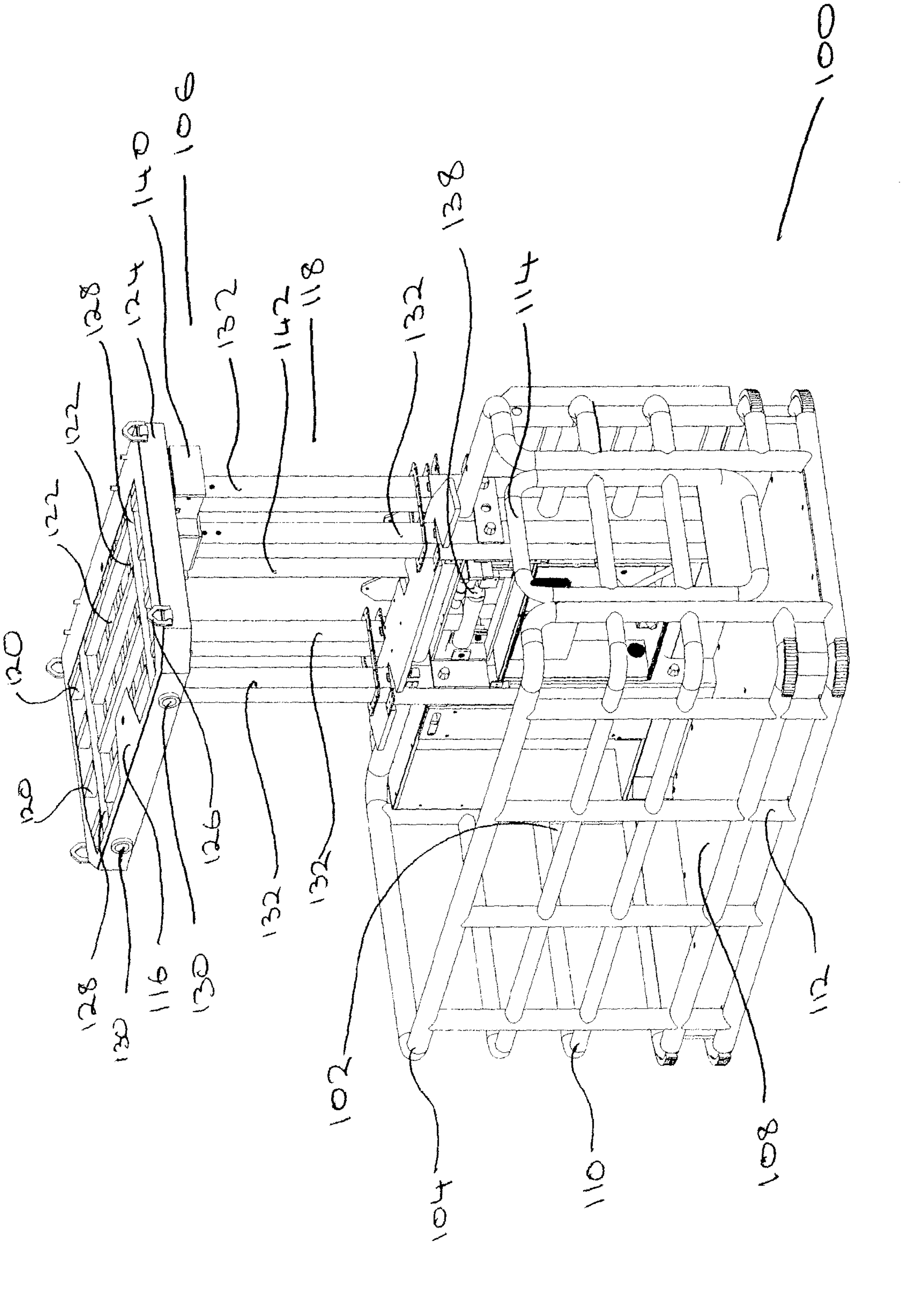
FIG. 1 is a perspective view of an operator work area mounting an impact protection canopy according to the invention.
Figure 3:
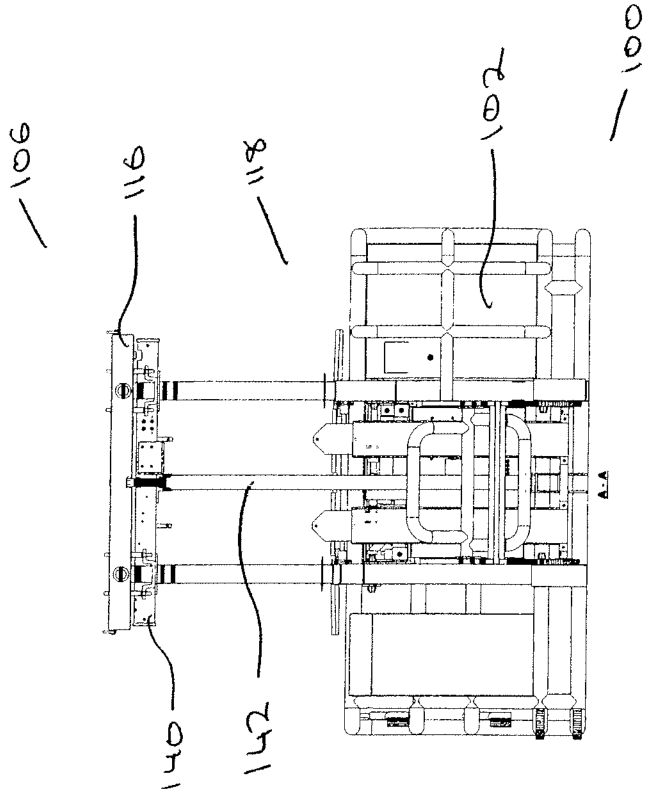
FIG. 3 is a front view of the operator work area mounting an impact-protection canopy according to the invention with the impact-protection canopy in the raised operating and extended working position.
Figure 2:
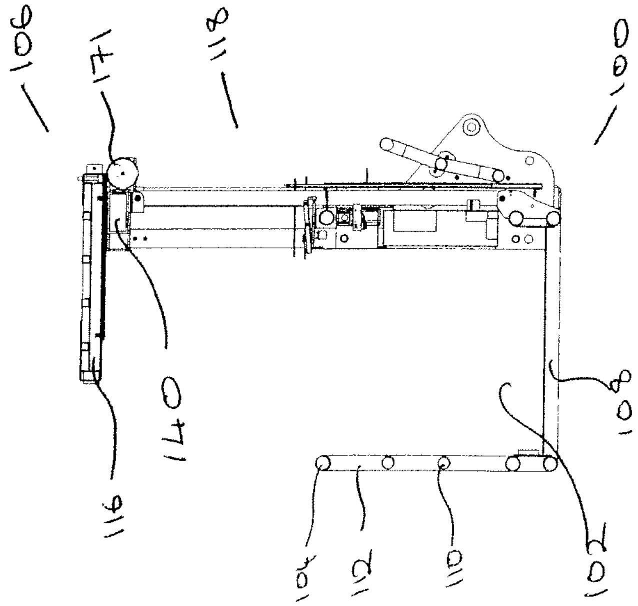
FIG. 2 is a side view of the operator work area mounting an impact-protection canopy according to the invention with the impact-protection canopy in the raised operating and extended working position.
Figure 5:
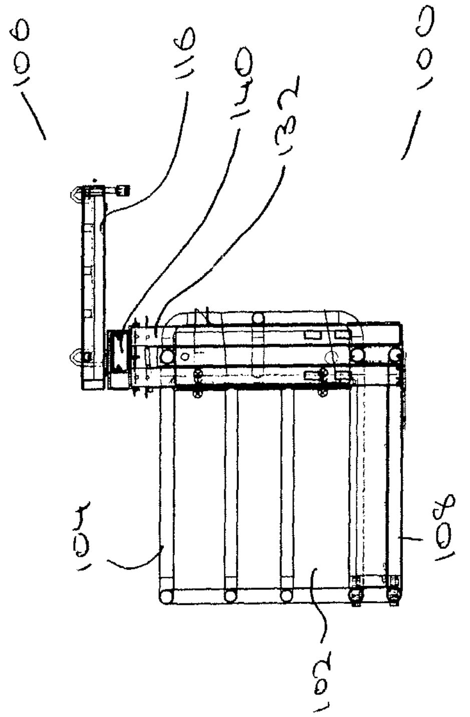
FIG. 5 is a side view of the operator work area mounting an impact-protection canopy according to the invention with the impact-protection canopy in the lowered storage and retracted stowed position.
Figure 4:
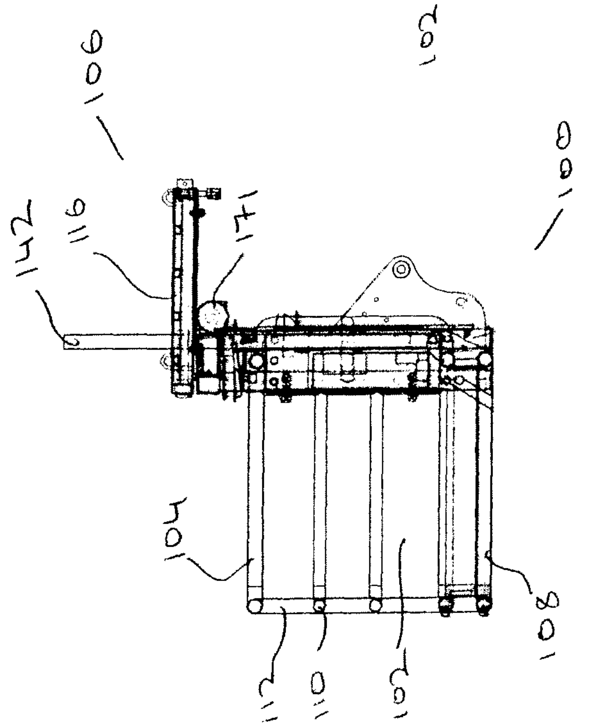
FIG. 4 is a side cross-section side view of the operator work area mounting an impact-protection canopy according to the invention with the impact-protection canopy in the lowered storage and retracted stowed position.
Figure 6:
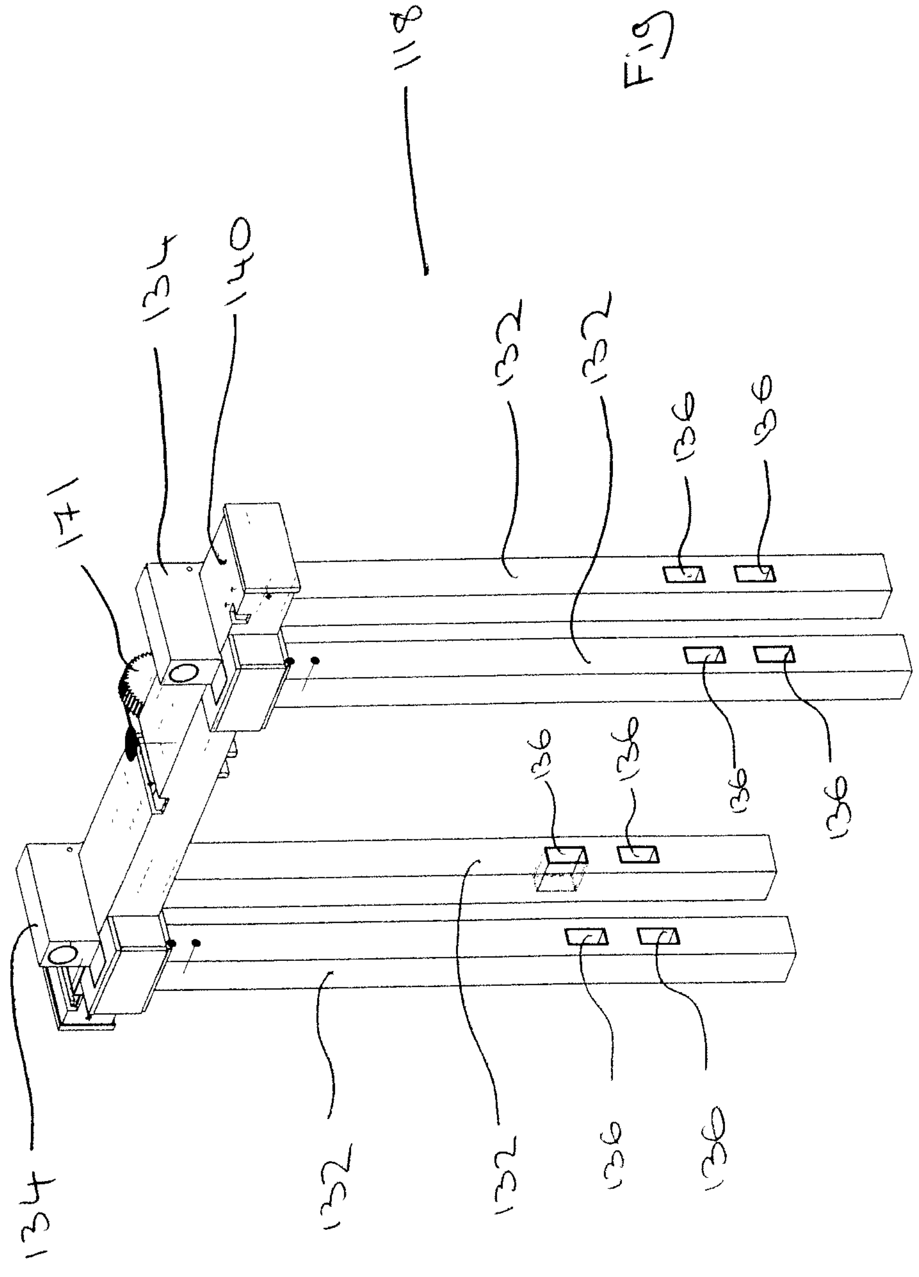
FIG. 6 is a perspective view of the support assembly of the impact-protection canopy according to the invention.

In FIGS. 1 and 2, the impact-protection canopy 106 is illustrated with the shelf in a cantilevered position relative to the support assembly 118. This corresponds to the extended working position for the impact-protection canopy 106. In this position, the shelf covers a portion of the operator work area and the majority of the operator work area is unimpeded by the impact-protection canopy 106.

The shelf 116 is mounted on a support assembly 118 comprising a pair of substantially vertical legs, wherein each leg comprises a pair of hollow vertical members 132. The vertical members are formed from box steel. Each pair of vertical members 132 is bridged by a bracket 134 to form a vertical leg. Each vertical member 132 comprises a pair of spaced apart elongate, rectangular apertures 136 in the lower quarter of the leg. The lower part of the support assembly 118 comprises a hydraulically driven locking pin assembly 138, which will be described in more detail in relation to FIG. 11. A block 140 is welded to each bracket 134 thus bridging the pair of vertical legs and forming a single support assembly 118. The block 140 is hollow and comprises system control and safety elements of the canopy of the invention such as end of stroke valves, proximity switches and warning lights.

Each vertical member 132 of the legs of the support assembly 118 is fitted slidably within a sleeve, the four sleeves being secured to the operator enclosure 100. The support assembly 118 is raiseable by a hydraulic lift cylinder 142. The hydraulic lift cylinder 142 forms part of a hydraulic Impact Energy Absorption Assembly (IEAA) which allows the impact-protection canopy to divert the impact energy away from the operator and operator work area and be dissipated in a controlled manner, thereby reducing damage to the operator work area and injury to the operator.

Referring now to FIGS. 11(*a*), (*b*), (*c*) and (*d*), in which like parts have been given the same reference numerals as before, there is shown perspective, top, side and front views of the locking pin assembly 138. The locking pin assembly 138 comprises four locking pins 144, which in use engage the apertures 136 in the legs 132 of the support assembly 118. The locking pins 144 are mounted in pairs, each pair projecting horizontally from a vertical plate 146. Each pair of locking pins 144 and their respective vertical plate 146 form a substantially C-shaped assembly, and are arranged collinearly and with similar orientation within the locking pin assembly 138 such that the open mount of one C-shaped assembly faces the vertical plate 146 forming the back of the other C-shaped assembly. The two vertical plates 146 are connected by a rod 148 which is in turn rigidly connected to the piston 152 of a hydraulic locking cylinder 150 such that on the extension of the piston 152 of a hydraulic locking cylinder 150, all locking pins move in one direction and on retraction of the piston the locking pins move in the opposite direction. The hydraulic locking cylinder 150 and piston 152 are housed within a rectangular frame 154.

Referring now to FIGS. 12(*a*), (*b*), (*c*) and (*d*), in which like parts have been given the same reference numerals as before, there is shown upside-down side; front; perspective and top views respectively of the bracket 134 which connects the vertical members 132 to form the legs of the support assembly 118. The bracket 134 further connects the arms 130 of the canopy 106 to the support assembly 118 in a manner than allows the energy from an impact on the shelf 116 to be relayed along the arms 130, through the bracket 134 to the IEAA comprising the hydraulic lift cylinder 142; and through the legs. The bracket comprises a main body comprising a pair of substantially cubic projections 158 for engagement with the top ends of the vertical members 132. The projections 158 comprise a pair of through-holes for reception of bolts for securing them in place on the vertical members 132. The bracket further comprises a top section 160 being substantially elongatedly cuboid in shape and having a longitudinal cylindrical bore for reception of the arms 130 of the shelf 116. The rear of the bracket 134 comprises a lug 162 having a lower face which extends orthogonally from the rear projection 158 and an upper face which curves downwardly and outwardly. The lug 162 further comprises a pair of vertical side faces. In practice, the lug 162 may comprise a cavity extending between the side faces to as to reduce the weight of the bracket. Additionally, the projections 158 may be made substantially hollow, the top section may be rounded off and the front face of the forward projection maybe chamfered downwardly from below the front of the shaft in the top section 160 to the top of the forward projection 158 to further reduce the weight of the bracket 134.

In use, the platform fits over the brackets 134 with the arms 130 engaging the longitudinal cylindrical bores of the brackets 134. In this way, each arm 130 passes through the bushing 170 in the frame 124 surrounding the platform, along the inverted channel to the bracket 134, through the cylindrical bore thereof, and then through another bushing 170 at the opposite side of the platform. In this way, the longitudinal cylindrical bore section of the bracket 134 protrudes into the inverted channels of the platform, with the inverted channels moving over the brackets as the shelf 116 extends and is retracted by the rack and pinion mechanism.

The platform, arms 130, brackets 134, block 140 and legs form an energy relay system that directs impact energy from the shelf 116 through to the IEAA and support assembly.

The canopy comprises a control panel (not shown) for operation thereof. The control panel comprises three hold-to-run buttons corresponding to the three possible locations of the canopy. A ‘Top’ button causes the main hydraulic lift cylinder 142 to operate so as to raise the canopy to its highest operational position; the hydraulic locking cylinder 150 to extend so as to cause the locking pin assembly 138 to engage such that all four locking pins 144 engage the upper set of rectangular apertures 136 in the legs 132; and operates the hydraulic motor so as to cause the pinion 171 to rotate and thus extend the shelf 116 over the operator work area 102. A ‘Middle’ button causes the main hydraulic lift cylinder 142 to operate so as to raise the canopy to a lower operational position; the hydraulic locking cylinder 150 to extend so as to cause the locking pin assembly 138 to engage such that all four locking pins 144 engage the lower set of rectangular apertures 136 in the vertical members 132; and operates the hydraulic motor so as to cause the pinion 171 to rotate and thus extend the shelf 116 over the operator work area 102. A ‘Bottom’ button causes the hydraulic motor to use the pinion to retract the shelf 116 until it is clear of the operator work area 102, release the locking pin assembly 138 by retracting the locking pins from the apertures 136 and finally to lower the main hydraulic lift cylinder 142. When the shelf 116 is fully extended over the operator work area, the retaining brackets 172 on the underside of the shelf 116 will hook over the lugs 162 at the rear of the brackets 134 in the support assembly 118.

Referring now to FIG. 13, in which like parts have been given the same reference numerals as before, there is shown a diagrammatic representation of the manner in which the energy from an impact to the impact-protection canopy 106 is dissipated. The main hydraulic lift cylinder 142 is connected to an energy absorbing means 174, comprised within the IEAA. The energy absorbing means 174 comprises a compartment 178 having a first 180 and second 182 chamber, such that the first chamber 180 is in fluid communication with the head side of the cylinder 142 by a narrow neck portion 184. The compartment 178 comprises a flexible membrane 186 dividing the two chambers, with the second chamber of the compartment 178 containing nitrogen gas. In use, if the piston of the main hydraulic lift cylinder 142 is pressed downwards by an impact on the impact-protection canopy 106, hydraulic fluid is pushed from the head side of the cylinder, through the narrow neck portion 184, into the first chamber 180, causing the membrane to deflect and compress the gas in the second chamber 182. Preferably, the compartment 178 has a volume of 0.325 liter, set at 160 bar. In this way, impact energy is relayed to the block in the support assembly and from there to the components of the IEAA, the hydraulic lift cylinder 142 and the energy absorbing means 147. The impact energy will push down on the main hydraulic lift cylinder 142 such that the impact energy compresses the nitrogen in the in the second chamber 182 of the energy absorbing means 174.

In use, in the case of an impact on the impact-protection canopy 106, the energy absorbing covering on top of the platform will absorb a portion of the impact energy. The lattice structure of the platform will absorb a further portion of the impact energy by allowing the shelf 116 to deflect with the impact of debris falling from above. This is further assisted by the fact that the lattice is not secured to the arms 130 so that any deflection of the lattice will cause the lattice to rotate about the arms 130 and the arms 130 will not therefore impede the deflection of the lattice. The arms will also bend under impact further absorbing energy, the ends of the arms sliding in the bushings as they bend. Additionally, energy will be relayed through the lattice of the platform to the arms 130 of the shelf 116 and from the arms 130 through to the brackets 134 and block 140, and from there to the IEAA including the hydraulic lift cylinder 142 and energy absorbing means 174, and down the legs. Energy is then absorbed by the compression of the hydraulic fluid within the hydraulic lift cylinder 142 and compression of the nitrogen gas contained within the energy absorbing means 174 connected to the hydraulic lift cylinder 142. FIG. 13 relates to the impact at the forward edge of the shelf 116. The turning moment generated by this impact can be seen to cause a pivoting motion of the shelf 116. The front of the shelf 116 is pushed down causing the rear portion to lift. This pivoting motion is resisted by the retaining brackets 172 as they engage the lugs 162 at the rear of the brackets. This pivoting motion causes the rear vertical members of the legs to be pulled slightly upwards and the front vertical members of the legs 132 to be pushed downwards. Energy is therefore relayed down the front vertical members of the legs 132 and in extreme cases may reach the locking pins of the support assembly.

The force of an impact on the impact-protection canopy 106 will be primarily dissipated by the main hydraulic lift cylinder 142 but some portion of the force may be transferred to the legs 132 and will cause the support assembly to be pushed downwards. This will be partially accommodated by the movement of the locking pins 144 in the rectangular elongate apertures 136 and thereafter resisted by the locking pins 144 bearing against the top of the rectangular apertures 136.

FIG. 13 further illustrates the three heights at which the canopy of the invention may used—a first raised position corresponding to the operation of the 'Top' button on the control panel; a second raised position, slightly lower than the first raised position and corresponding to the operation of the 'Middle' button; and a lowered position, corresponding to the operation of the 'Bottom' button. The first raised position and second raised position correspond to the raised operating position while the lowered position corresponds to the lowered storage position.

Referring now to FIG. 14, in which like parts have been given the same reference numerals as before, there is shown a diagrammatic representation of the manner in which the energy from an impact to the impact-protection canopy 106 is dissipated, in this case, for an impact directly above the hydraulic lift cylinder 142. In this case, it can be seen that there is negligible turning moment generated by the impact and the energy travels straight down components of the IEAA, including the hydraulic lift cylinder 142 and to the energy absorbing means. Energy will also be relayed down the legs 132 of the impact-protection canopy 106 to the locking pins.

Referring now to FIG. 15, in which like parts have been given the same reference numerals as before, there is shown a diagram of the hydraulic circuit used to control the raising of the canopy; the operation of the locking pin assembly; and the motor for the extension of the shelf 116 over the operator work area. The hydraulic circuit comprises the main hydraulic lift cylinder 142 having the compartment 174 connected thereto; the hydraulic locking cylinder 150 for operation of the locking pin assembly 138; and a hydraulic motor 176 to operate the pinion 171 so as to extend the shelf 116.

The impact-protection canopy of the invention comprises an emergency isolation bar that deactivates all controls on the control unit except for the release button so as to ensure that the device can be stopped quickly is a potential breach in safety occurs during operation.

It will be understood that the impact-protection canopy of the invention can be fitted to a wide variety of operator work area assemblies and is not limited to that shown here.

In the specification the terms 'comprise', 'comprises', 'comprised' and 'comprising' or any variation thereof and the terms 'include', 'includes', 'included' or 'including' or any variation thereof are considered to be totally interchangeable and they should all be afforded the widest possible interpretation.

The invention is not limited to the embodiment herein described, but may be varied in both construction and detail within the terms of the claims.

The invention claimed is:

1. An impact-protection canopy suitable for use with an operator work area of a plant vehicle wherein the impact-protection canopy comprises a shelf mounted on a support assembly which is in turn mountable on the plant vehicle, the shelf being mounted on the support assembly such that the shelf is movable to and from an extended working position over the operator work area and a retracted stowed position clear of the operator work area, and a hydraulic impact energy absorption assembly (IEAA) comprising a hydraulic lift cylinder connected to, and suitable for raising and lowering, the support assembly, the hydraulic lift cylinder having a head side, and wherein the hydraulic IEAA further comprises an energy absorbing means connected to the hydraulic lift cylinder.

2. An impact-protection canopy as claimed in claim 1 in which, in the extended working position, the shelf is mounted on the support assembly in a cantilevered manner.

3. An impact-protection canopy as claimed in claim 1 in which the shelf is movable to and from a raised operating position clear above the operator work area and a lowered storage position.

4. An impact-protection canopy as claimed in claim 1 in which the energy absorbing means comprises a compartment divided by a flexible membrane into at least two chambers, a first chamber in fluid communication with the head side of the hydraulic lift cylinder and a second chamber comprising a compressible gas.

5. An impact-protection canopy as claimed in claim 4 in which the first chamber of the energy absorbing means is in fluid communication with the head side of the hydraulic lift cylinder by way of a narrow neck portion.

6. An impact-protection canopy as claimed in claim 1 in which the shelf comprises a platform supported by at least one substantially rigid arm mounted on the support assembly, wherein the platform is deflectably coupled to the at least one arm.

7. An impact-protection canopy as claimed in claim 6 in which the shelf comprises a pair of substantially rigid arms.

8. An impact-protection canopy as claimed in claim 6 in which the at least one arm comprises a substantially cylindrical bar and is coupled to the platform by engagement with complementarily dimensioned bushings in the platform.

9. An impact-protection canopy as claimed in claim 6 in which the platform comprises a lattice of longitudinal and transverse bars.

10. An impact-protection canopy as claimed in claim 6 in which the support assembly comprises a pair of spaced apart substantially vertical legs each having a bracket affixed to the upper end thereof and a block engaging each bracket so as to bridge the space between the legs.

11. An impact-protection canopy as claimed in claim 10 in which the shelf comprises a pair of arms and each arm thereof engages one of the brackets.

12. An impact-protection canopy as claimed in claim 10 further comprises a plurality of sleeves mountable on the plant vehicle, the vertical legs of the support assembly being slidably mounted in the sleeves.

13. An impact-protection canopy as claimed in claim 10 in which each vertical leg comprises a pair of vertical members.

14. An impact-protection canopy as claimed in claim 13 in which the vertical members are hollow.

15. An impact-protection canopy as claimed in claim 13 in which the pair of vertical members are bridged by one bracket.

16. An impact-protection canopy as claimed in claim 2 in which the support assembly comprises a locking assembly for maintaining the raised or lowered position of the shelf.

17. An impact-protection canopy as claimed in claim 16 in which the locking assembly is hydraulically operated.

18. An impact-protection canopy as claimed in claim 16 in which the locking assembly comprises a plurality of locking pins, slidable to and from a locked position engaging one of a pair of apertures in each of the sleeves and legs and an open position clear of the apertures.

19. An impact-protection canopy as claimed in claim 18 in which the apertures are longer than the height of the locking pins.

20. An impact-protection canopy as claimed in claim 1 in which the top of the shelf has an energy absorbing covering thereon.

21. An operator work area for a plant vehicle comprising the impact-protection canopy as claimed in claim 1.

22. An impact-protection canopy suitable for use with an operator work area of a plant vehicle wherein the impact-protection canopy comprises a shelf mounted on a support assembly which is in turn mountable on the plant vehicle, the shelf being mounted on the support assembly such that the shelf is movable to and from an extended working position over the operator work area and a retracted stowed position clear of the operator work area wherein the impact-protection canopy comprises a hydraulic Impact Energy Absorption Assembly (IEAA) having a hydraulic lift cylinder connected to, and suitable for raising and lowering, the support assembly, the hydraulic lift cylinder having a head side, the hydraulic IEAA further comprising an energy absorbing means connected to the hydraulic lift cylinder.

23. An impact-protection canopy suitable for use with an operator work area of a plant vehicle wherein the impact-protection canopy comprises a shelf mounted on a support assembly which is in turn mountable on the plant vehicle, the shelf being mounted on the support assembly such that the shelf is movable to and from an extended working position over the operator work area and a retracted stowed position clear of the operator work area wherein the impact-protection canopy comprises a hydraulic Impact Energy Absorption Assembly (IEAA) having a hydraulic lift cylinder connected to, and suitable for raising and lowering, the support assembly, the hydraulic lift cylinder having a head side, the hydraulic IEAA further comprising an energy absorbing means connected to the hydraulic lift cylinder, the energy absorbing means comprising a compartment divided by a flexible membrane into at least two chambers, a first chamber in fluid communication with the head side of the hydraulic lift cylinder and a second chamber comprising a compressible gas.

24. An impact-protection canopy suitable for use with an operator work area of a plant vehicle wherein the impact-protection canopy comprises a shelf mounted on a support assembly which is in turn mountable on the plant vehicle, the shelf being mounted on the support assembly such that the shelf is movable to and from an extended working position over the operator work area and a retracted stowed position clear of the operator work area wherein the shelf comprises a platform supported by at least one substantially rigid arm mounted on the support assembly, wherein the platform is deflectably coupled to the at least one arm.

* * * * *